United States Patent
Ban et al.

(10) Patent No.: US 6,212,893 B1
(45) Date of Patent: Apr. 10, 2001

(54) AIR CONDITIONING SYSTEMS

(75) Inventors: Takashi Ban; Toshiro Fujii; Takanori Okabe; Yoshiyuki Nakane, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/412,444

(22) Filed: Oct. 4, 1999

(30) Foreign Application Priority Data

Oct. 5, 1998 (JP) .................................................. 10-283117

(51) Int. Cl.$^7$ .................................. F25B 1/00; F04B 1/26
(52) U.S. Cl. ........................ 62/117; 62/228.3; 236/78 D; 417/213
(58) Field of Search ............................... 62/228.3, 228.5, 62/117, 196.1; 236/78 D; 417/213, 222.2

(56) References Cited

U.S. PATENT DOCUMENTS

| | | | |
|---|---|---|---|
| 5,823,000 | * 10/1998 | Takai | 62/228.3 |
| 6,095,426 | * 8/2000 | Ahmed et al. | 236/78 D |
| 6,105,380 | * 8/2000 | Yokomachi et al. | 62/228.3 |

FOREIGN PATENT DOCUMENTS

| | | |
|---|---|---|
| 5-223357 | 8/1993 | (JP) . |
| 7-19630 | 1/1995 | (JP) . |
| 10-47242 | 2/1998 | (JP) . |

* cited by examiner

*Primary Examiner*—William Wayner
(74) *Attorney, Agent, or Firm*—Morgan & Finnegan,LLP

(57) ABSTRACT

An air conditioning system 100 may include a compressor 101 having a driving chamber 111, a heating circuit 310 and a controller 203. This system may release high pressure refrigerant from the compressor discharge port 141 into the compressor driving chamber 111 by opening a capacity control valve 181 when the discharge pressure of the refrigerant discharged from the compressor 101 exceeds a predetermined reference value. By increasing the pressure within the driving chamber 111, the compressor discharge capacity can be reduced. As a result, the discharge pressure of the compressor 101 will be reduced by the reduction in the compressor discharge capacity. Further, the controller 203 may decrease the reference value in accordance with a value related to change in the discharge pressure. As a result, the capacity control valve 181 can be opened at an early stage of the increasing of the discharge pressure if the discharge pressure increases rapidly.

20 Claims, 4 Drawing Sheets

AIR CONDITIONING SYSTEMS

BACKGROUND OF THE INVENTION

1. Field of the Invention

The present invention relates to air conditioning systems that utilize refrigerants and a compressor, and particularly to air conditioning systems capable of alleviating excessive increases in refrigerant discharge pressure within a heating circuit.

2. Description of the Related Art

A known air conditioning system is disclosed in Japanese Patent Application No. 7-19630 and includes a compressor 1, a cooling circuit 51, a heating circuit 52 and a controller 83, as shown in FIG. 5. The cooling circuit 51 includes a condenser 55, a first expansion valve 57 and a heat exchanger 59 provided on a passage connecting a discharge port D to a suction port S of the compressor 1. High pressure refrigerant discharged from the discharge port D of the compressor 1 is drawn through the above respective devices and back to the compressor 1.

The heating circuit 52 includes a bypass passage 52a extending from the discharge port D of the compressor 1 to the heat exchanger 59. A second expansion valve 63 provided within the bypass passage 52a between the discharge port D and the heat exchanger 59. The high pressure refrigerant discharged from the compressor 1 is not directed to the condenser 55, but rather is drawn by the compressor 1 through the second expansion valve 63 and the heat exchanger 59. Such a heating circuit 52 is generally known as a hot gas bypass heater.

The operation of the cooling circuit 51 and the heating circuit 52 is changeably selected by opening and closing selector valves 53a and 53b, which opening and closing operations are performed by the controller 83.

Because the refrigerant discharge pressure is higher when the heating circuit 52 is used than when the cooling circuit 51 is used, the air conditioning system must operate in a high pressure state when the heating circuit 52 is utilized. An abnormally high-pressure state may be created if the output discharge capacity of the compressor 1 temporarily increases during the operation of the heating circuit 52. A refrigerant releasing passage 91 having a pressure relief valve 93 is provided in order to release excess pressure from the heating circuit 52, if an abnormally high pressure state is reached. The refrigerant releasing passage 91 is connected to the heating circuit 52 and the cooling circuit 51 and the pressure relief valve 93 can be opened to release the refrigerant from the heating circuit 52 into the cooling circuit 51 when the refrigerant discharge pressure abnormally increases during the operation of the heating circuit 52.

Because the cooling circuit 51 and the heating circuit 52 are alternatively selected by the selector valves 53a and 53b, the refrigerant is released into the cooling circuit 51 which is not used in operation of the heating circuit 52, thereby preventing the discharge pressure at the heating circuit 52 from increasing abnormally.

However, because the refrigerant in the heating circuit 52 is released into the cooling circuit 51 whenever the discharge pressure abnormally increases, the amount of the refrigerant in the heating circuit 52 is reduced and heating performance may be reduced. Moreover, because the high pressure refrigerant is wastefully released from the heating circuit, energy efficiency is reduced.

Another known variable displacement compressor is disclosed in Japanese Patent Application No. 10-47242. Although this compressor is not explicitly shown in the drawings, a connecting passage having a capacity control valve is provided between a discharge port and a driving chamber (also known as the crank case) in a housing such that refrigerant is released from the discharge port into the driving chamber when the capacity control valve is opened. The capacity control valve is opened to increase pressure in the driving chamber when the discharge pressure is high. On the other hand, the capacity control valve is closed to decrease the pressure in the driving chamber when the discharge pressure is low.

The output discharge capacity is decreased when the pressure in the driving chamber is increased, and the output discharge capacity is increased when the pressure in the driving chamber is decreased. The output discharge capacity is decreased to decrease the discharge pressure when the discharge pressure increases, and the output discharge capacity is increased to increase the discharge pressure when the discharge pressure decreases.

If the variable displacement compressor disclosed in Japanese Patent Application No. 10-47242 is employed in the air conditioning system having the hot gas bypass heater circuit disclosed in Japanese Patent Application No. 7-19630, abnormally high pressure can be solved without the insufficiency in the heating performance due to release of the refrigerant in the hot gas bypass heater circuit into the cooling circuit and without low energy efficiency due to wasteful release of the refrigerant at highly increased pressure by causing the compressor to work.

However, a problem can occur due to a combination of a characteristics of the variable displacement compressor and a characteristics of the hot gas bypass heater by only employing the variable displacement compressor disclosed in Japanese Patent Application No. 10-47242 in the air conditioning system having the hot gas bypass heater circuit disclosed in Japanese Patent Application No. 7-19630. As described above, because a step of opening the capacity control valve of the compressor to increase the pressure in the driving chamber, a step of decreasing the output discharge capacity and a step of decreasing the discharge pressure are necessary to alleviate the abnormal high pressure state of the discharge pressure in utilizing the technique disclosed in Japanese Patent Application No. 10-47242.

Therefore, if the discharge pressure increases drastically during these steps, the discharge pressure may abnormally be increased and the hot gas bypass heater circuit may be damaged by such abnormal increase in pressure because above-explained steps require considerable time to be completed.

The technique disclosed in Japanese Patent Application No. 10-47242 does not have a hot gas bypass heater circuit and has only the cooling circuit. In such a case, the pressure of the refrigerant flowing through the cooling circuit is inherently lower than the pressure of the refrigerant flowing through the hot gas bypass heater circuit, and the cooling circuit may not be damaged by abnormal increase in pressure.

In other words, the technique disclosed in Japanese Patent Application No. 10-47242 is sufficient when the hot gas bypass heater circuit is not employed. However, if the air conditioning system has the hot gas bypass heater circuit, because the pressure of the refrigerant during operation of the hot gas bypass heater circuit is inherently high, the output discharge capacity control technique of the known variable displacement compressor is insufficient to quickly alleviate the abnormal increase in pressure.

SUMMARY OF THE INVENTION

It is, therefore, an object of the present invention to provide an air conditioning system that can alleviate abnormal high discharge pressure more sufficiently.

Preferably, an air conditioning system may include a compressor having a driving chamber, a heating circuit and a controller. This system may release high pressure refrigerant from the compressor discharge port into the compressor driving chamber by opening a capacity control valve when the discharge pressure of the refrigerant discharged from the compressor exceeds a predetermined reference value. By increasing the pressure within the driving chamber, the compressor discharge capacity can be reduced. As a result, the discharge pressure of the compressor will be reduced by the reduction in the compressor discharge capacity. Further, the controller may decrease the reference value in accordance with a value related to change in the discharge pressure. For example, increasing speed of the discharge pressure may preferably be utilized as a value related to change in the discharge pressure. As a result, the capacity control valve can be opened at an early stage of the increasing of the discharge pressure if the discharge pressure increases rapidly. Therefore, even if a considerable time is required for decreasing the output discharge capacity to decrease the discharge pressure, abnormal high pressure state of the discharge pressure can effectively be alleviated because the increasing discharge pressure soon exceeds the decreased reference value thereby starting the release of the refrigerant at an early stage of the abnormal high pressure state.

Other objects, features and advantages of the present invention will be readily understood after reading the following detailed description together with the accompanying drawings and the claims.

DETAILED DESCRIPTION OF THE INVENTION

Figure 1:
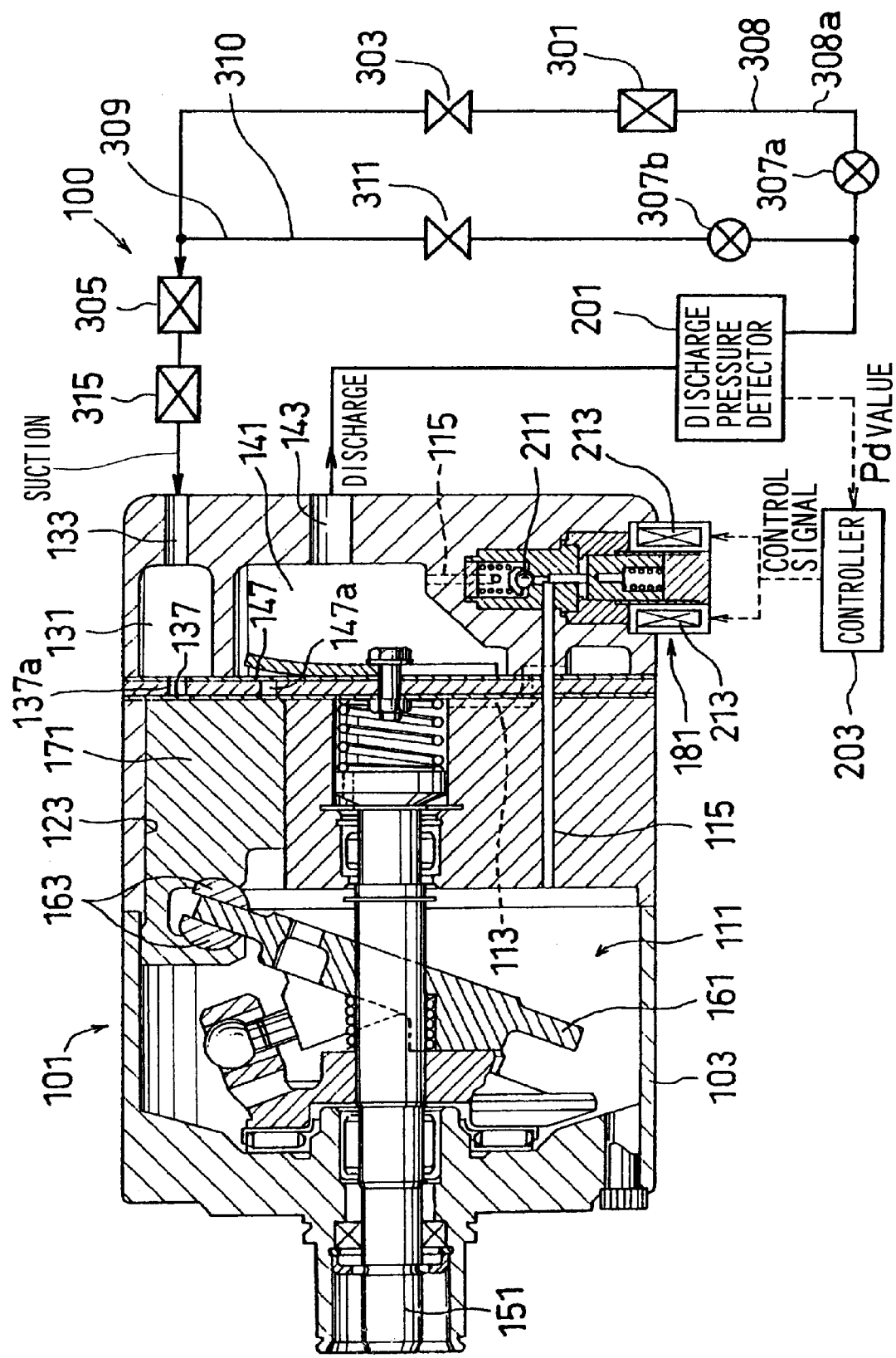
FIG. 1 shows an air conditioning system according to a first representative embodiment.

Preferably, an air conditioning system includes a compressor, a heating circuit and a controller. The compressor may have a driving chamber, a suction port for drawing refrigerant into the compressor and a discharge port for discharging high pressure refrigerant from the compressor. The high pressure refrigerant also can be released from the discharge port into the driving chamber in order to change the output discharge capacity of the compressor. The heating circuit may have a passage that extends from the discharge port of the compressor to a heat exchanger and through the heat exchanger. The controller may open the capacity control valve when discharge pressure of the refrigerant exceeds a predetermined reference value. Further, the controller may decrease the reference value in accordance with a value related to change in the discharge pressure.

According to this example, the capacity control valve may be opened to communicate the discharge port with the driving chamber when the discharge pressure of the refrigerant exceeds the reference value. Because the high pressure refrigerant may be released from the discharge port to the driving chamber, the pressure in the driving chamber can be increased and the output discharge capacity of the compressor can be decreased and thus the discharge pressure of the compressor can be decreased.

The reference value may be decreased in accordance with the value related to change in the discharge pressure of the refrigerant. When the discharge pressure increases rapidly, the controller may decrease the reference value. Thus, the discharge pressure may exceed the decreased reference value relatively at an early stage of increasing of the discharge pressure. This is, the capacity control valve can be opened and the alleviation of the high pressure can be started at relatively early stage of the discharge pressure increase. On the other hand, the capacity control valve is not opened when the discharge pressure does not increase rapidly and thus, the high reference value can be utilized when the discharge pressure does not increase rapidly, and the pressure of the refrigerant flowing through the heating circuit can be maintained at high.

For example, changing speed in the discharge pressure, i.e. one-time differential value of the discharge pressure with time, may preferably be utilized as the value related to the change in the discharge pressure because the changing speed of the discharge pressure directly reflects the rapid increase of the discharge pressure. However, the value related to change in the discharge pressure is not limited to a one-time differential value. Two-time differential value, three-time differential value or n-time differential value (i.e., multiple time differential value) can be utilized. If a multiple differential value is utilized, it is easily detected whether the increasing speed is high or low at the initial stage of increase in the discharge pressure.

The decreasing amount of the reference value may be a fixed quantity that does not depend on the value related to the change in the discharge pressure or may be a variable quantity that depends on the value related to the change in the discharge pressure. If the fixed quantity is utilized, a controller program can be simplified. If the variable quantity is utilized, the average pressure of the refrigerant flowing through the heating circuit can be maintained at high. A decompressor such as an expansion valve may preferably be provided, in the heating circuit, onto the passage that extends from the discharge port to the heat exchanger.

In a second representative example, the changing speed in the discharge pressure (one-time differential value) may be utilized as the value related to the change in the discharge pressure.

In this example, the reference value may be decreased in accordance with the hanging speed in the discharge pressure. The discharge pressure that increases relatively rapidly may exceed the decreased reference value soon. Thus the controlling of the output discharge capacity can start at an initial stage of such rapid increase.

In a third representative example, the decreasing amount of the reference value may be the fixed quantity that is not dependent on the value related to change in the discharge pressure.

According to this example, the reference value of the discharge pressure may be any one of a original reference value and a reference value smaller than the original reference value by a constant quantity. Therefore, the control program can be simplified.

In a fourth representative example, the decreasing amount of the reference value may be variable depending on the value related to change in the discharge pressure.

According to this example, the reference value can be changed by closely following the real change in the discharge pressure. When the discharge pressure increases rapidly, the reference value may be decreased in response to such rapid increase so that the alleviation of the abnormal high discharge pressure can be started at an early stage of the increase. On the other hand, when the discharge pressure increases relatively slowly, the decreasing amount of the reference value may be small in response to such slow increase in order to prevent the discharge pressure from decreasing more than is necessary. In other words, because the reference value is variable depending on the value related to change in the discharge pressure, the average pressure of the refrigerant flowing through the heating circuit can be maintained at high while preventing the heating circuit from being damaged.

Each of the additional features and method steps disclosed above and below may be utilized separately or in conjunction with other features and method steps to provide improved air conditioning systems and methods for designing and using such air conditioning systems. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

First Detailed Representative Embodiment

Referring to FIG. 1, the air conditioning system 100 may include a variable displacement compressor 101, a cooling circuit 308, a heating circuit 309 and a controller 203. Such an air conditioning system 100 may be utilized in a vehicle-mounted air conditioning system. In such case, a compressor driving shaft 151 may be coupled to and driven by an automobile engine, though it is not particularly shown in the drawings.

The cooling circuit 308 may be driven by high-pressure refrigerant, which is compressed by the compressor 101, and may include a capacitor 301, a first expansion valve 303, a heat exchanger 305 and an accumulator 315. These devices may be disposed within a path 308a that extends from a discharge port 143 to a suction port 133 of the compressor 101. The heat exchanger 305 is generally known as an evaporator.

The heating circuit 309 is driven by high-temperature and high-pressure refrigerant, which is also compressed by the compressor 101, and may include a second expansion valve 311, the heat exchanger 305 and the accumulator 315. These devices may be disposed on a bypass passage 310 for introducing the refrigerant discharged from the discharge port 143 to the heat exchanger 305. In other words, the heating circuit 309 partially overlaps with the cooling circuit 308. Such a heating circuit 309 is also generally known as a hot-gas bypass heater. The heat exchanger 305 may be arranged side by side with a hot-water heater (not shown), which circulates hot water from the engine.

In FIG. 1, a first open/close valve 307a and a second open/close valve 307b may be utilized as switch valves for alternatively actuating the cooling circuit 308 and the heating circuit 309.

A Pd value detector 201 (shown in FIG. 1 as discharge pressure detector) may detect discharge pressure of the compressor 101 and may input the Pd value as a detected value into the controller 203.

During operation of the cooling circuit 308, the refrigerant is compressed by the compressor 101 to attain a high temperature and high pressure state. This compressed refrigerant is sent to the capacitor 301, where heat from the high-temperature refrigerant is dissipated to the outside environment and the refrigerant is liquefied. The refrigerant is decompressed by the first expansion valve 303 and sent to the heat exchanger 305 where the refrigerant absorbs outside heat and is gasified. The gasified refrigerant is returned to the compressor 101 again through the accumulator 315 for re-circulation throughout the system 100.

During operation of the heating circuit 309, the refrigerant is compressed by the compressor 101 to attain a high temperature and high pressure state. The compressed refrigerant is then decompressed by the second expansion valve 311 and sent to the heat exchanger 305, where heat from the compressed refrigerant is dissipated to the outside environment. In the heating circuit cycle, the refrigerant is constantly in a gaseous state while circulating through the heating circuit 309.

The heating circuit 309 may be used as an auxiliary heater. Heat generated by the heat exchanger 305 during operation of the heating circuit 309 may be used as an auxiliary heating source for the hot water heater described above. The heating circuit 309 also may be used to assist the coolant from the engine when the coolant can not provide sufficient heat to start the engine in a low-temperature environment, such as an outside air temperature of −20° C. or so.

A representative compressor 101 may include a front housing 103, a driving chamber 111 defined inside the front housing 103 and a swash plate 161 that is rotatably supported by a driving shaft 151 in the driving chamber 111. The swash plate 161 may be supported by the driving shaft 151 and may rotate together with the driving shaft 151. The swash plate 161 is inclined with respect to the driving shaft 151 when the driving shaft 151 rotates and the inclination angle of the swash plate 161 with respect to a plane perpendicular to the axis of rotation of the driving shaft 151 is changeable.

The peripheral edge portion of the swash plate 161 may be connected to the base portions of pistons 171 by means of movable shoes 163. Six pistons 171 in total may be disposed around the driving shaft 151 (however, only one piston is shown in FIG. 1 for the sake of convenience) and may be laterally slide within six cylinder bores 123. The circumferential positions of the six cylinder bores 123 are fixed by the front housing 103.

When the swash plate 161 rotates together with the driving shaft 151 while being inclined as shown in FIG. 1, the peripheral edge of the swash plate 161 slides with respect to the piston 171 fixed in the circumferential direction. When the peripheral edge of the swash plate 161 being inclined to a position closest to the cylinder bores 123 is position in the piston 171 (as shown in FIG. 1), the piston 171 reaches its deepest insertion into the cylinder bores 123. When the peripheral edge of the swash plate 161 (the peripheral edge shown in a lower part of FIG. 1) being inclined to a position furthest away from the cylinder bores 123, the piston 171 is substantially withdrawn from the cylinder bore 123. Each 360° rotation of the driving shaft 151 results in each piston 171 laterally reciprocating one time.

A suction port 137a and a discharge port 147a are defined in a bottom portion of each the cylinder bore 123. A suction valve 137 is positioned to correspond to the suction port 137a and a discharge valve 147 is positioned to correspond to the discharge port 147a. Each suction port 137a communicates with a suction chamber 131 and each discharge port 147a communicates with a discharge chamber 141.

When the piston 171 moves to the left in FIG. 1, as a result of rotation of the swash late 161, refrigerant is introduced from the suction opening 133 through the suction chamber 131, suction port 137a and suction valve 137 into the cylinder bore 123. When the piston 171 moves to the right in FIG. 1, as a result of further rotation of the swash plate 161, the refrigerant is compressed into a high-pressure state and discharged from a discharge opening 143 through the discharge port 147a, discharge valve 147 and discharge chamber 141.

The output discharge capacity of the compressor 101 is determined by the stroke length of the piston 171, which is determined by the degree of change in inclination angle of the swash plate 161 during each cycle. That is, the further the swash plate 161 is withdrawn from the cylinder bore 123 during each cycle, the longer the stroke length of the piston 171 will be. As the stroke length increases, the output discharge capacity of the compressor 101 also increases.

As shown in FIG. 1, the suction chamber 131 and the driving chamber 111 may be connected by a decompression passage 113. The discharge chamber 141 and the driving chamber 111 may be connected by a discharge capacity control passage 115. A capacity control valve 181 is provided within the discharge capacity control passage 115. The capacity control valve 181 is a solenoid valve that includes a valve body 211 and a solenoid 213 and may open or close the discharge capacity control passage 115 by exciting or not exciting the solenoid 213. Opening/closing of the capacity control valve 181 is controlled by the controller 203.

The inclination angle of the swash plate 161 is determined, in part, by the difference in pressure on the opposite sides of the piston 171, i.e., the pressure difference between driving chamber pressure and the cylinder bore pressure. The above-described opening/closing operation of the capacity control valve 181 can adjust this pressure difference by releasing the high pressure refrigerant from the discharge chamber 141 to the driving chamber 111.

Thus, in order to decrease the output discharge capacity, the capacity control valve 181 is opened to release the high pressure refrigerant in the discharge chamber 141 into the driving chamber 111. Due to resulting increasing in the driving chamber pressure, the swash plate 161 will stands and the stroke length of the piston 171 decreases. Therefore, the output discharge capacity also will decrease. On the other hand, in order to increase the output discharge capacity, the capacity control valve 181 is closed so that the refrigerant in the discharge chamber 141 is prevented from being released into the driving chamber 111. As a result, the driving chamber pressure will gradually decrease, the swash plate 161 will move further in the lateral direction and the stroke length of the piston 171 will increase. In this case, the output discharge capacity will increase.

In the operation of the cooling circuit 308, the controller 203 may input a detected value of suction pressure detector (not shown) and may open the capacity control valve when suction pressure is in a certain low-pressure state in order to decrease the output discharge capacity. Thus, the suction pressure increases and the heat exchanger 305 is prevented from being frosted. Because the average discharge pressure during the operation of the cooling circuit 308 is lower than of the heating circuit 309, the rapid increase of the discharge pressure of the refrigerant does not cause specific problems onto the cooling circuit 308.

In the operation of the heating circuit 309, the capacity control valve 181 is normally closed. On the contrary, when the Pd value that is a value of the discharge pressure detected by the Pd value detector 201 (shown in FIG. 1 as discharge pressure detector) is larger than the reference value, the capacity control valve 181 is opened for releasing the refrigerant from discharge port 141 to the driving chamber 111 thereby decreasing the output discharge capacity. When the discharge pressure Pd exceeds the predetermined reference value, the controller 203 send a control signal to the capacity control valve 181 for exciting the solenoid 213, thereby separating the valve body 211 from the valve sheet and opening the discharge capacity control valve 181. As a result, the refrigerant is released from the discharge chamber 141 into the driving chamber 111.

During the operation of the heating circuit 309, the discharge pressure is maintained a relatively high value for effectively utilizing energy. On the other hand, the discharge pressure is still increased even after starting the decreasing control of the output discharge capacity. Therefore, the discharge pressure tends to exceed the predetermined upper limit of the heating circuit 309 particularly when the discharge pressure increases rapidly.

Figure 2:
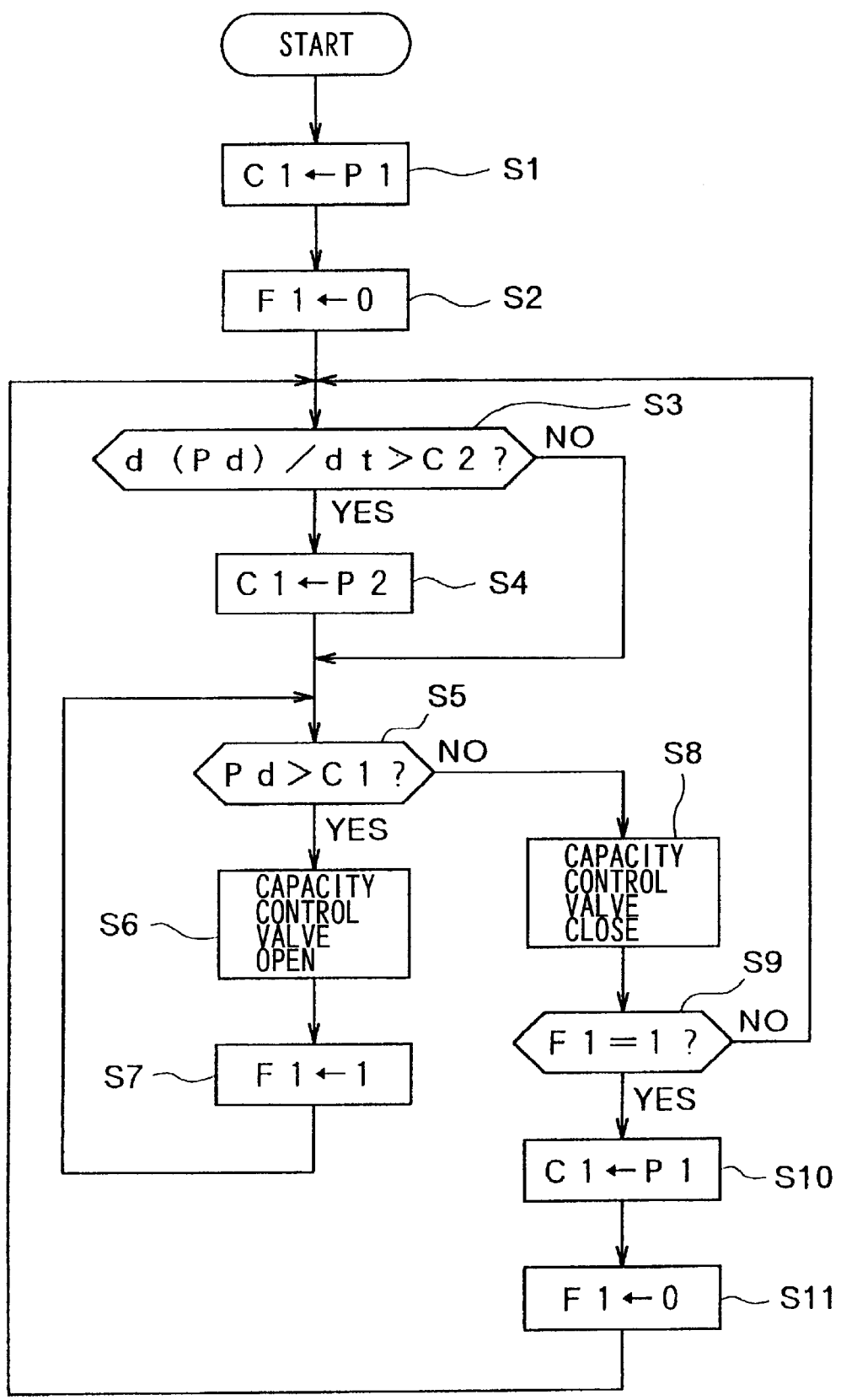
FIG. 2 shows controlling procedure according to the first representative embodiment.
Figure 3:
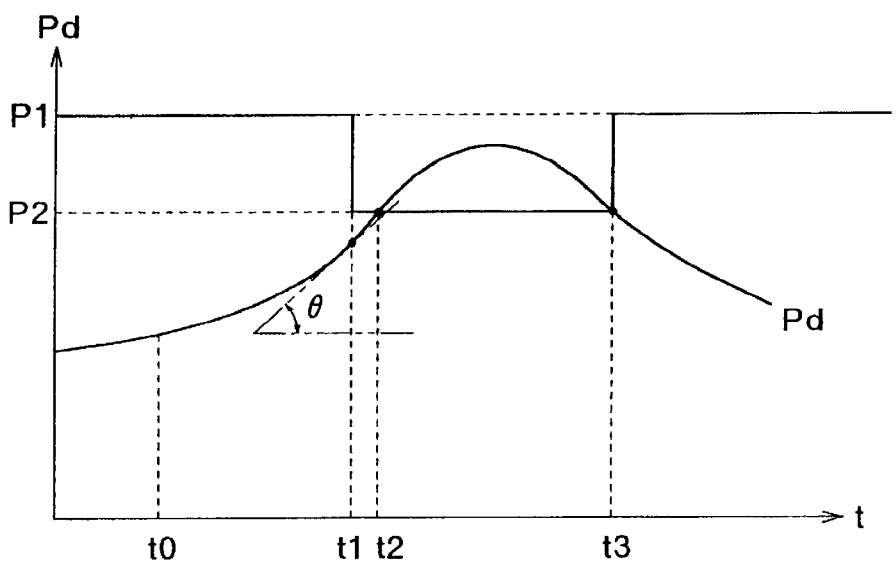
FIG. 3 shows a mode of control according to the first representative embodiment.

Thus, a measure against such rapid increase of the discharge pressure during the heating circuit 309 is provided as shown in FIG. 2 and FIG. 3.

Referring to FIG. 2, which shows a flowchart of control procedure, when the control procedure starts in the flowchart, a value P1 is inputted into a reference value C1 in step S1. The reference value C1 is a reference value related to the discharge pressure Pd and this reference value C1 is utilized for deciding if the capacity control valve 181 should be opened to release the refrigerant into the driving chamber 111. P1 is given as a reference value in a normal state during the operation of the heating circuit 309 (non-abnormally high-pressure state).

In step S2, "0" is inputted into a flag F1. The flag represents an open/closed state information of the capacity control valve 181. When the capacity control valve 181 is opened, "1" is inputted while "0" is inputted when the capacity control valve 181 is closed.

In step S3, the system judges if the increasing speed value d(Pd)/dt, i.e., one-time differential value of the discharge pressure Pd, exceeds a predetermined value C2. The predetermined value C2 is a reference value for judging if the increasing speed of the discharge pressure Pd is high.

If the increasing speed exceeds C2 (in a case of "Yes" in step S3), the procedure goes step S5 after a value P2 is inputted into the reference value C1 in step S4. P2 is a value putted into the reference value C1 instead of P1 that is greater than P2 when abnormally high-pressure state will result based upon the increasing speed of the discharge pressure Pd.

If the increasing speed does not exceed C1 (in a case of "No" in step S3), the procedure goes to step S5 deciding that discharge pressure Pd is not increasing rapidly. In such a case, the reference value C1 is maintained.

In step S5, the system judges if the discharge pressure Pd exceeds the reference value C1. At this time, P1 or P2 may be inputted into the reference value C1.

If the discharge pressure Pd exceeds the reference value C1 (in a case of "Yes" in step S5), the capacity control valve 181 (see FIG. 1) is opened in step S6. In step S7, "1" is inputted into the flag F1 in order to record that the capacity control valve 181 is opened. Opening of the capacity control valve 181 is repeated until the system judges that the discharge pressure Pd does not exceed the reference value C1 in step 5. In other words, the capacity control valve 181 is opened to continue releasing the refrigerant into the driving chamber 111 (see FIG. 1) until the discharge pressure Pd becomes smaller than the reference value C1.

If the discharge pressure Pd does not exceed the reference value C1 (in a case of "No" in step S5), the capacity control valve 181 is closed in step S8. Such a operation of closing the capacity control valve 181 in step S8 includes a case that the discharge pressure Pd has never exceeded the reference value C1 and a case that the discharge pressure Pd has exceeded the reference value C1 and has been decreased to be lower than the reference value C1 as a result of an opening operation of the capacity control valve 181. In order to identify these two cases, the content of the flag F1 is checked in step S9. When the value of F1 is "1", i.e., when the procedure went to steps S8 and S9 after the opening operation of the capacity control valve 181, the reference value C1 is changed to the original value P1 in step 10. In other words, the reference value C1 is restored to the original reference value. Furthermore, "0" is inputted into the flag F1 in step S11 and the procedure returns to step S3.

When the capacity control valve 181 has not been opened (in a case of "No" in step S9), the procedure returns from step S9 to step S3.

Referring to FIG. 3, the discharge pressure Pd increases from the time t0 as an example. The change of the discharge pressure Pd with time is detected continuously by the Pd value detector 201 and the controller 203 shown in FIG. 1. The controller 203 calculates the increasing speed (one-time differential value) of the discharge pressure based upon the discharge pressure Pd value. At time t0 in FIG. 3, the system judges that the increasing speed of the discharge pressure Pd has not yet reached the predetermined value P1 and the reference value P1 is not changed. This procedure corresponds to step S3 in FIG. 2.

If the discharge pressure Pd increases in FIG. 3 and the system judges that the increasing speed of the discharge pressure has reached the predetermined value at time t1 (slope θ in FIG. 3 represents the increasing speed of the discharge pressure), the reference value P1 is changed to new reference value P2. The new reference value P2 is given as a value obtained by subtracting a fixed quantity from the former reference value P1, which corresponds to step S4 in FIG. 2. As a result, the system continuously judges if the discharge pressure Pd exceeds the reference value P2 after time t1. Therefore, if the discharge pressure further increases, the discharge pressure soon exceeds the new reference value P2. FIG. 3 shows a case that the discharge pressure Pd exceeded the new reference value P2 at time t2. At this time, the controller 203 shown in FIG. 1 judges that the discharge pressure Pd has exceeded the reference value P2 and transmits a signal to open the capacity control valve 181 in FIG. 1, which corresponds to steps S5 and S6 in FIG. 2. By this opening of the capacity control valve 181, the refrigerant is released from the discharge chamber 141 into the driving chamber 111.

Then, the swash plate 161 shown in FIG. 1 starts to stand, the piston stroke length decreases, the output discharge capacity decreases, and the discharge pressure decreases. As shown in FIG. 3, the discharge pressure Pd continues to increase over the reference value P2 after time t1 when the capacity control valve is opened. However, the reference value is decreased from P1 to P2 when the increasing speed is high. Therefore, even if the discharge pressure rapidly exceeds over the reference value, this reference value P2 is smaller than the original reference value P1 and the discharge pressure is prevented from increasing excessively over the original reference value.

When the refrigerant is released from the discharge chamber 141 shown in FIG. 1 into the driving chamber 111 and when the controller 203 judges that the discharge pressure Pd has decreased to be less than the reference value P2 (shown as time t3 in FIG. 3), the system determines the an abnormally high-pressure state in the discharge pressure to be alleviated. Thus, the capacity control valve 181 is closed, the release of the refrigerant from the discharge chamber 141 into the driving chamber 111 is finished (corresponding to step S8 in FIG. 2) and the reference value is then reset from P2 to P1 (corresponding to step S10 in FIG. 2).

In this representative embodiment, when the discharge pressure increases rapidly, the reference value is decreased P2 that is lower than the original value P1. Therefore, the increasing discharge pressure Pd exceeds the decreased reference value at an initial stage of the abnormal high pressure state (shown as time t2 in FIG. 3). As a result, because the release of the refrigerant into the driving chamber 111 starts at an initial stage of the increase in the discharge pressure, abnormal high discharge pressure can be alleviated sufficiently.

Second Detailed Representative Embodiment

In the second representative embodiment, decreasing amount of the reference value is a value obtained by subtracting a predetermined percentage of increasing speed in the discharge pressure from the reference value, i.e., a new reference value P2 is given as a variable quantity that is calculated based on the equation "$P2=P1-d(Pd)/dt \times$ constant C".

Therefore, when the increasing speed of the discharge pressure increases, i.e., when a degree of increase in the discharge pressure is getting greater, the reference value P2 is given such that the reference value P2 decreases successively.

In this embodiment, because the decreasing amount of the reference value is variable in accordance with the degree of the increase in the discharge pressure, alleviation of the discharge pressure can be precisely controlled as to reflect the real change of the discharge pressure in time.

Third Detailed Representative Embodiment

Figure 4:
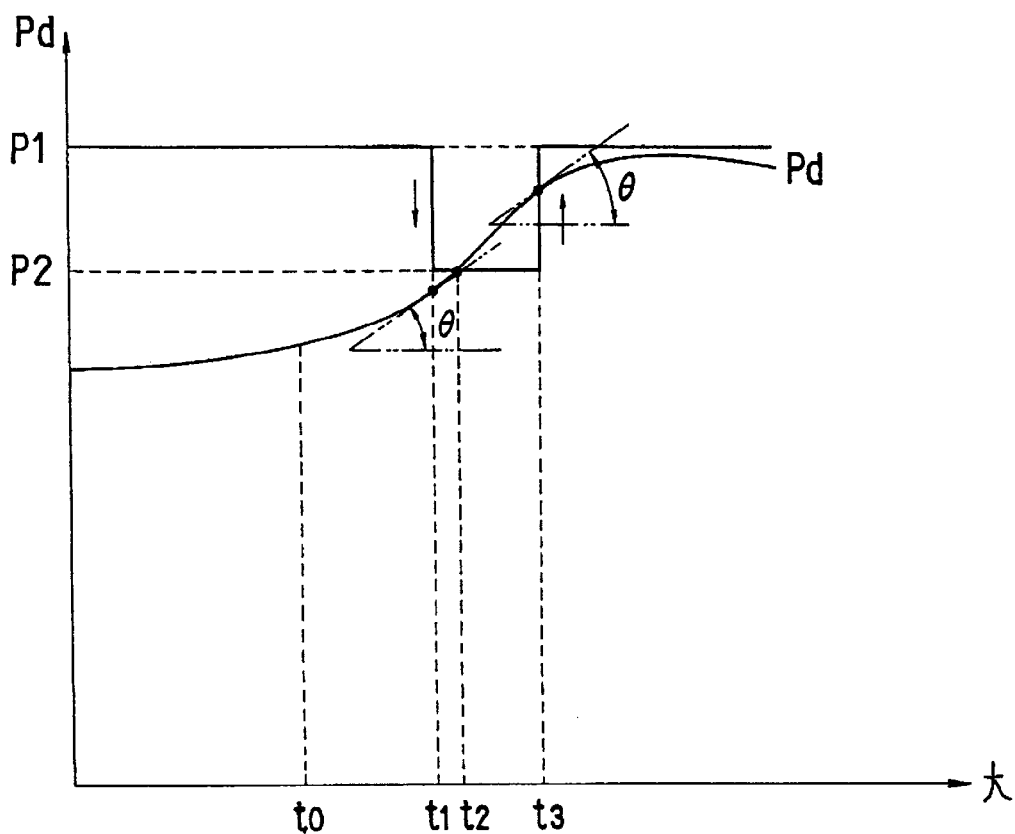
FIG. 4 shows a mode of control according to a third representative modification.
Figure 5:
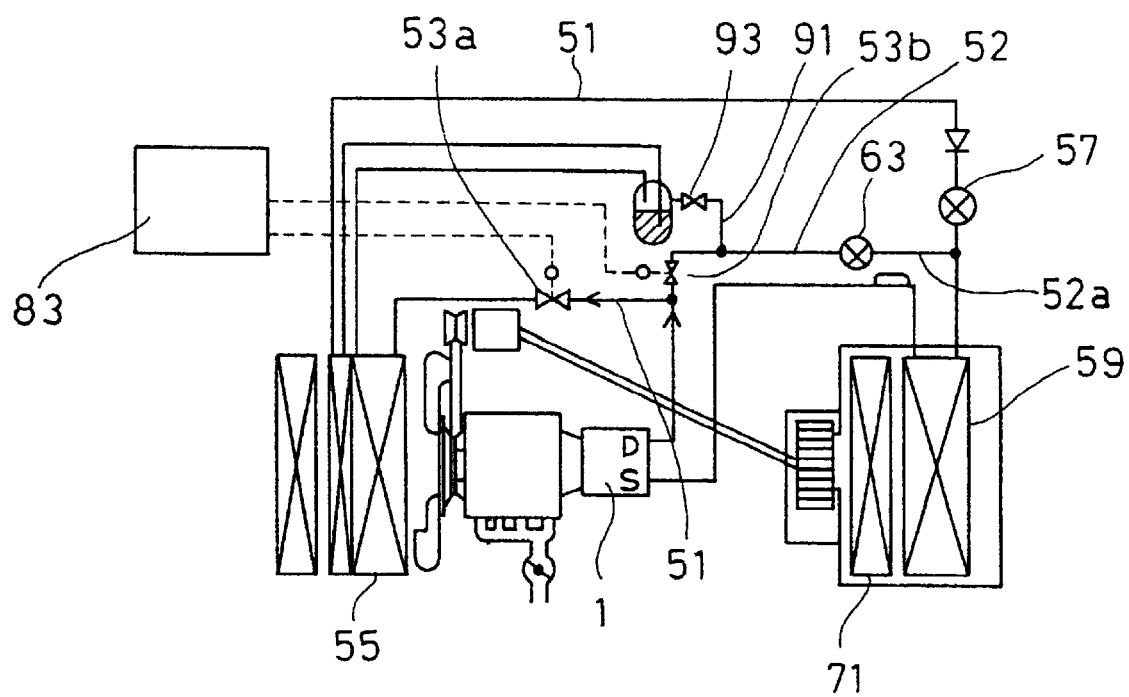
FIG. 5 shows a known air conditioning system.

In the third detailed representative embodiment, the decreased reference value P2 is restored to the original reference value P1 when the increasing speed of the discharge pressure is equal to or less than the predetermined value. As shown in FIG. 4, the reference value is decreased from P1 to P2 when the increasing speed of the discharge pressure Pd exceeds the predetermined value at time t1 and the discharge pressure Pd exceeds the reference value P2 at time t2 and the capacity control valve is opened. Then, the reference value is restored from P2 to P1 when the increasing speed of the discharge pressure Pd has decreased to be equal to or less than the predetermined value (at time t3),. Slope θ in FIG. 4 represents the increasing speed of the discharge pressure Pd. Therefore, the capacity control valve 181 is to be opened during the time from t2 to t3 in FIG. 3 for releasing the refrigerant from the discharge port 141 as shown in FIG. 1 into the driving chamber 111. In this embodiment, because the reference value is restored to the original reference value without waiting for the state in which the discharge pressure is decreased to be equal to or less than the decreased reference value, the loss of the energy efficiency can be minimized.

Fourth Detailed Representative Embodiment

In the fourth representative embodiment, the reference value of the discharge pressure Pd is decreased in accordance with a change rate of the increasing speed, i.e., a two-time differential value of a curve formed by the discharge pressure Pd.

It is known in the mathematical field that a curve bulges upward when a two-time differential value results negative and that a curve bulges downward when a two-time differential value results positive. In this embodiment, when the Pd curve bulges upward, the reference value is not decreased on the assumption that the discharge pressure Pd will not increase sharply hereafter because the discharge pressure curve bulges upward.

When a two-time differential value is positive, i.e., the Pd curve bulges downward, the reference value P1 is decreased because the discharge pressure Pd is expected to increase sharply hereafter. As a result, the discharge pressure Pd soon exceeds the decreased reference value at an early stage of the sharp increase and the controller 203 (shown in FIG. 1) opens the capacity control valve 181 to release the refrigerant from the discharge chamber 141 into the driving chamber 111.

Fifth Detailed Representative Embodiment

In above-explained first to fourth representative embodiments, reference value is decreased when the discharge pressure increases rapidly. However, it is not rational to judge all the time as to whether the increasing speed exceeds the predetermined value even when the discharge pressure does not increase to approach the reference value at all.

Therefore, in the fifth representative embodiment, a parameter as to whether the discharge pressure Pd has been increased to be close to the reference value is utilized in addition to the n-time differential value of the discharge pressure Pd.

In this embodiment, the reference value is decreased only when the discharge pressure is equal to or greater than a predetermined percentage (e.g., 80%) of the reference value and the increasing speed of the discharge pressure exceeds the predetermined value. As another example, the reference value is decreased only when the discharge pressure is equal to or greater than the predetermined percentage (80%) of the reference value and a curve of the change rate of the increasing speed of the discharge pressure bulges downward.

Sixth Detailed Representative Embodiment

In the sixth representative embodiment, the opening degree of the capacity control valve is variable in accordance with an excess of the discharge pressure over the reference value. In this embodiment, although it is not particularly shown in drawings, a step motor is utilized for opening/closing the valve instead of utilizing the solenoid 213. According to this embodiment, the capacity control valve is opened in accordance with the degree of increase in the discharge pressure. Therefore, precise alleviation of the high discharge pressure can be realized.

A one-sided swash plate type of compressor, i.e., a compressor having pistons 171 disposed on only one side of the swash plate 161 in FIG. 1, is used as the variable displacement compressor in above-explained representative embodiments. However, a double-ended piston type can also be used in the variable displacement compressor, in which pistons are connected to opposite sides of the swash plate for reciprocation. Further, although the controller, discharge pressure detector are disposed outside the compressor, these means can be provided within the compressor in part or in whole. Although the air conditioning system was described as having both a cooling circuit and a heating circuit in the representative embodiments, the cooling circuit may be removed, because the present teachings are preferably utilized to alleviate high pressure states within the heating circuit.

Further, although it is not particularly shown in the drawings, following features may be preferably employed to any of the representative embodiments.

First, driving chamber decompression means that releases the refrigerant from the driving chamber 111 in FIG. 1 into the suction area (suction chamber 131, suction port 137a or suction opening 133) separately from the decompression passage 113 when the driving chamber 111 is brought into a predetermined high-pressure state. The driving chamber decompression means may preferably have a passage extending from the driving chamber 111 to the suction area and a driving chamber decompression valve provided on the passage. The driving chamber decompression valve is opened when the driving chamber is brought into the predetermined high-pressure state in order to release the high-pressure refrigerant from the driving chamber 111 to the suction area to thereby prevent the airtight seal of the driving chamber 111 from being degraded.

Second, means for releasing the refrigerant directly from the discharge area (discharge chamber 141 or discharge opening 143) into the suction area may preferably be provided. The refrigerant releasing means may preferably have a passage extending from the discharge area to the suction area and a refrigerant releasing valve provided on the passage. The refrigerant releasing valve is opened when the discharge pressure is extremely increased such that the normal control by decreasing the compressor discharge capacity can not alleviate the extreme increase in the discharge pressure. Therefore, such means can be utilized as an emergent releasing means for decreasing the abnormal high-pressure state of the refrigerant.

What is claimed is:

1. An air conditioning system comprising:
    a compressor having a driving chamber, a suction port, a discharge port, wherein compressed refrigerant may be released by opening a capacity control valve from the discharge port into the driving chamber to decrease the compressor output discharge capacity,
    a heating circuit having a heat exchanger and a passage extending from the discharge port to the suction port through the heat exchanger,
    a controller that opens the capacity control valve when discharge pressure of the refrigerant exceeds a reference value, the controller decreasing the reference value in accordance with a value related to change in the discharge pressure of the refrigerant.

2. An air conditioning system according to claim 1 further comprising a cooling circuit having a capacitor disposed on a path extending from the discharge port to the suction port and said heat exchanger disposed downstream from said capacitor.

3. An air conditioning system according to claim 1, wherein the compressor further comprises:
    a swash plate connected to a driving shaft disposed within the driving chamber, the swash plate rotating together with the driving shaft at an inclination angle with respect to a plane perpendicular to the driving shaft and
    a piston disposed in a cylinder bore, an end portion of the piston connected to a peripheral edge of the swash plate by means of a shoe, the piston reciprocating in the cylinder bore to compress the refrigerant in response to rotation of the swash plate in the driving chamber of the compressor.

4. An air conditioning system according to claim 1, wherein the value related to change in the discharge pressure is changing speed in the discharge pressure.

5. An air conditioning system according to claim 1, wherein the value related to change in the discharge pressure is an n-time differential value of change in the discharge pressure with time.

6. An air conditioning system according to claim 1, wherein decreasing amount of the reference value is a fixed quantity that is not dependent on the value related to change in the discharge pressure.

7. An air conditioning system according to claim 1, wherein decreasing amount of the reference value is variable depending on the value related to change in the discharge pressure.

8. An air conditioning system according to claim 7, wherein decreasing amount of the reference value is a value obtained by subtracting a predetermined percentage of increasing speed of the discharge pressure from the reference value.

9. An air conditioning system according to claim 1, wherein the controller restores the decreased reference value to the original reference value.

10. An air conditioning system according to claim 9, wherein the decreased reference value is restored to the original reference value based upon the value related to change in the discharge pressure.

11. An air conditioning system according to claim 9, wherein the decreased reference value is restored to the original reference value when the decreased discharge pressure becomes equal to or less than the reference value.

12. An air conditioning system according to claim 1, wherein the reference value is changed based upon the value related to change in the discharge pressure only when the discharge pressure exceeds a predetermined percentage of the reference value.

13. An air conditioning system according to claim 1, wherein opening degree of the capacity control valve is changed in accordance with an excess of the discharge pressure over the reference value.

14. A method of using the air conditioning system according to claim 1 comprising the steps of:
    opening the capacity control valve when discharge pressure of the refrigerant exceeds a reference value,
    decreasing the reference value in accordance with a value related to change in the discharge pressure of the refrigerant.

15. A method according to claim 14, wherein the value related to change in the discharge pressure is changing speed in the discharge pressure.

16. A method according to claim 14, wherein the value related to change in the discharge pressure is an n-time differential value of change in the discharge pressure with time.

17. A method according to claim 14, wherein decreasing amount of the reference value is a fixed quantity that is not dependent on the value related to change in the discharge pressure.

18. A method according to claim 14, wherein decreasing amount of the reference value is variable depending on the value related to change in the discharge pressure.

19. A vehicle comprising an air conditioning system according to claim 1 and an engine for driving the compressor.

20. A method for controlling discharge pressure of refrigerant in an air conditioning system comprising the steps of:
    releasing refrigerant by opening a capacity control valve from the discharge port of a compressor into the driving chamber of the compressor to decrease the compressor output discharge capacity,
    opening the capacity control valve when discharge pressure of the refrigerant exceeds a reference value,
    decreasing the reference value in accordance with a value related to change in the discharge pressure of the refrigerant.

* * * * *

UNITED STATES PATENT AND TRADEMARK OFFICE
CERTIFICATE OF CORRECTION

PATENT NO. : 6,212,893 B1  
DATED : April 10, 2001  
INVENTOR(S) : Ban et al.

Page 1 of 1

It is certified that error appears in the above-identified patent and that said Letters Patent is hereby corrected as shown below:

<u>Column 6,</u>  
Line 47, please change "may be 10" to -- may be --;

<u>Column 8,</u>  
Line 20, please change "maintained a" to -- maintained at a --;

<u>Column 10,</u>  
Line 9, please change "determines the an" to -- determines an --.

Signed and Sealed this

Seventh Day of May, 2002

Attest:

Attesting Officer

JAMES E. ROGAN  
*Director of the United States Patent and Trademark Office*